Figure 1:
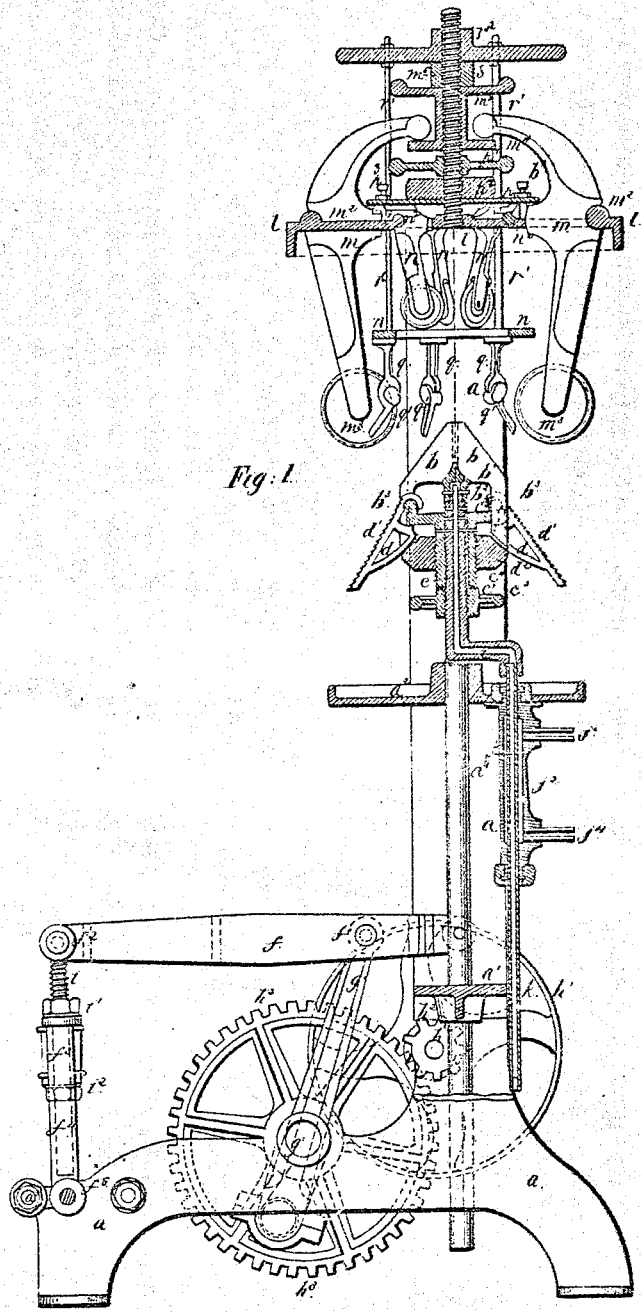

R. Eickemeyer.
Hat Blocking & Stretching Mach.
N° 91,730. Patented Jun. 22, 1869.

Witnesses:
Inventor:
R. Eickemeyer

R. Eickemeyer.
Hat Blocking & Stretching Mach.
Nº 91,730. Patented Jun. 22, 1869.

Sheet 2, 2 Sheets.

Witnesses:

Inventor:
R. Eickemeyer

United States Patent Office.

RUDOLF EICKEMEYER, OF YONKERS, NEW YORK, ASSIGNOR TO EICKEMEYER HAT-BLOCKING MACHINE COMPANY, OF SAME PLACE.

*Letters Patent No. 91,730, dated June 22, 1869.*

IMPROVEMENT IN HAT-STRETCHING MACHINES.

The Schedule referred to in these Letters Patent and making part of the same.

*To all whom it may concern:*

Be it known that I, RUDOLF EICKEMEYER, of Yonkers, in the county of Westchester, and State of New York, have invented certain new and useful Improvements in Machinery for Stretching Hat-Bodies; and I do hereby declare that the following is a full and correct description thereof, reference being had to the accompanying drawings, and to the letters of reference marked thereon.

This invention consists of improvements upon a machine for stretching hat-bodies, for which Letters Patent of the United States, No. 46,553, dated February 28, 1865, were granted to me, said Letters Patent having been since reissued to "The Eickemeyer Hat-Blocking Machine Company," December 1, 1868. That machine consisted generally of a radially-ribbed or skeleton former, whereon the hat-body was placed to be stretched, and the ribs of which acted as internal-supporting and stretching-surfaces, in combination with a series of external stretching-devices, acting upon the outside portions of the hat-body, in opposition to the internal action of the ribs of the skeleton former, and between the lines of support of the same, to stretch the hat-body embraced between them, as required, to develop the shape of the hat. There was also a clamping-ring, to hold the hat-body to the ribbed former.

In said machine, the upper series of ribs, which supported the tip of the hat-body, and the lower series of ribs, which supported the brim of the hat-body, were fixed in position, and therefore, in order to stretch hat-bodies of different sizes, or of different conical outline, different skeleton or ribbed formers were required; and the object of a part of my present improvements is to avoid this necessity of removing the skeleton former, and substituting another, of different form, in its place, when operating upon different-shaped hats.

Some hat-bodies have higher crowns than others, the crowns varying in height, as taste or fashion dictates.

To accommodate the machine to the variation of heights of crowns, I have made the two series of ribs, which support the tip and brim, adjustable, relatively to each other, in a vertical direction, so that the series of supporting-ribs, which support the tip, may occupy a higher or lower position relatively to the lower series of supporting-ribs, which support the brim, as required, for stretching hat-bodies with crowns of various heights. I have found it most convenient to make this vertical adjustment by raising or lowering the lower series of supporting-ribs, the upper series or tip-ribs remaining stationary.

Hat-bodies are of different conical shapes, according to the styles into which they are to be developed, and require correspondingly-different inclinations of the lower supporting-ribs, to receive them, and present them properly for the action of the exterior stretching-devices.

To obviate the necessity of a multiplicity of skeleton-ribbed formers, corresponding with such variations of forms of hat-bodies, I have made the brim-supporting ribs conically adjustable to different inclinations, by hinging them, at their upper ends, to a ring or hub, and providing them with a means of expansion and support beneath, so that they may be varied in position, as required, and co-operate with the exterior stretching-devices, (the latter being properly adjusted,) to stretch hat-bodies of various different conical forms; and for the purpose of adapting the machine to stretch hat-bodies of different-sized crowns, and different conical shapes, without exchanging the ribbed former, I have combined both of the above-mentioned improvements together, so that the machine may be changed, both with respect to the relative height of the crown-ribs, and the angle of inclination of the brim-ribs.

In the practical operation of stretching hats in my machine, I have found it desirable to apply steam to the hat-body. To do this in the most effectual manner, I introduce steam within the hat-body by a steam-pipe, which discharges steam within the limits of the ribs which support the hat-body; and I have also combined with the machine an automatic contrivance, to shut off the steam when the operation of stretching the hat-body has been performed, and the supporting and stretching-surfaces removed from each other, for the purpose of replacing or rearranging the hat-body.

But to more particularly describe my invention, I will refer to the accompanying drawings, of which—

Figure 3:
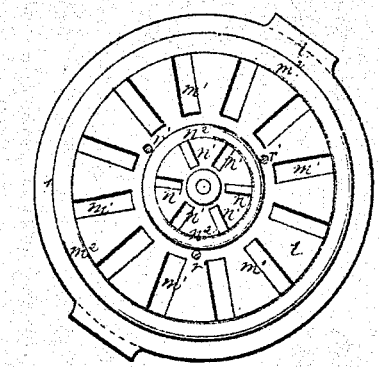
Figure 6:
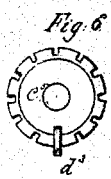
Figure 4:
Figure 7:
Figure 5:
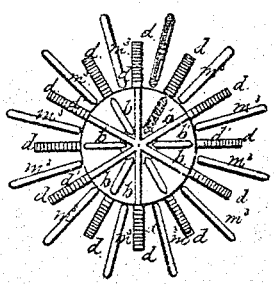
Figure 2:
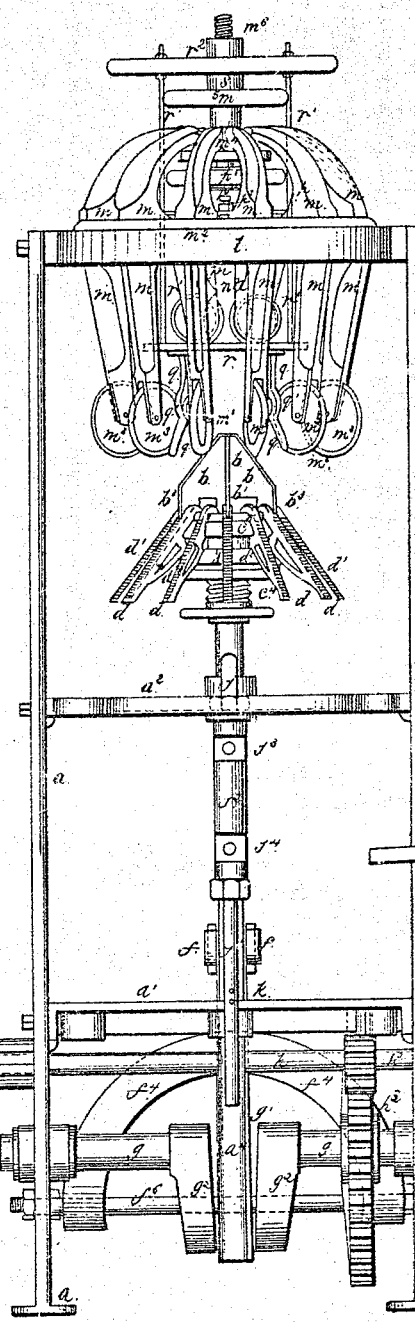

Figure 1 is a longitudinal vertical section of the machine;

Figure 2, a front elevation;

Figure 3, a detached view of the plate which supports the stretching-fingers;

Figure 4, detached view of clamping-finger;

Figure 5, skeleton-top view, showing the relative position of both series of the supporting-ribs, and their respective series of stretching-rollers or fingers;

Figure 6 is a plan view of the circular ring or hub to which the hinged ribs are hinged; and Figure 7, a view of the small piece $d^5$, put in the notches of the circular ring, to keep the hinged fingers in place.

The frame of the machine consists of two side frames, $a\ a$, framed together by the cross-plates $a^1\ a^2$, and a tie-rod, $a^3$.

The cross-plate $a^2$ is made in the form of a shallow annular trough, to catch water of condensation from the steam used in the operation of stretching.

In the middle of the cross-frame plates bosses are cast, in which vertical holes are bored, to serve as guides for the round vertical-reciprocating lifting-rod or spindle $a^4$, to the upper end of which is secured the series of ribs $b$, for supporting the tip of the hat-body.

These ribs are projected radially from the hub $b^1$, on which they are cast, and a hole being bored in the hub, it is slipped on to the upper end of the lifting-rod, and secured by a pin, $b^2$.

The vertical sides $b^3$, of the ribs $b$, are made long enough to allow for different heights of crown, and when used with the hinged ribs, for stretching, are adjusted relatively thereto.

Upon the lifting-rod $a^4$, below the ribs for supporting the tip of the hat-body, a screw, $c$, is cut and fitted with a nut, $c^1$, to which is attached a hand-wheel, $c^2$.

This nut supports and moves a sleeve, $c^4$, which encircles the lifting-rod loosely enough to admit of its moving freely up and down on the lifting-rod.

A circular hub or ring, $c^5$, is cast with the upper part of the sleeve, having its upper edge rounded, to receive the hooked ends of the series of hinged radial ribs $d$, which may be twelve in number, and which hinge upon the rounded edge of the ring, as shown in the drawings.

The outer edges of the hinged ribs have inclined notches, $d^1$, cut in them, to prevent the hat-body from slipping upward on the ribs during the stretching operation.

These hinged ribs should be as long, or a little longer, than the maximum width of brims of the hat-bodies to be stretched on the machine.

The hinged ribs are supported and extended by a circular plate or nut, $d^2$, which moves up and down on a screw cut on the outside of the sleeve $c^4$, the inner edges of the ribs resting on the edges of the circular plate.

The hand-wheel and nut, which supports the sleeve and hinged ribs, is turned only when it is necessary to adjust the two parts of the ribbed former to a particular height of crown.

When the crown is to be made lower, the hinged ribs and their supports are raised up bodily, the circular hub or ring on which the hinged fingers are pivoted being notched at the periphery, correspondingly to the position of the tip-ribs, so that their vertical parts pass through it, and oppose no resistance to the movement, up or down, of the brim part of the ribbed former.

The hinged ribs are split or forked at their hooked ends, so as to hook on the circular hub or ring on both sides of each tip-rib, the tip-rib thus keeping the hinged ribs in place; but, as there are not as many tip-ribs as hinged ribs, those of the hinged ribs not kept in place by the tip-ribs are kept in place by small hooked pieces $d^3$, which are hooked to the circular ring or hub at equal distance apart, notches being cut in the periphery to receive them; and in case the tip-ribs should not be used, similar pieces may be placed in the slots for the tip-ribs, to keep in place the hinged ribs, before kept in place circumferentially by the tip-ribs; but the manner of hinging the ribs to the circular plate is not essential. It may be done in any convenient way known to mechanics.

Motion is communicated to lifting-rod by means of a lever, $f$, one of the forked ends of which is jointed to the lifting-rod by a pin, $f^1$, and the other by a pin, $f^2$, to an adjustable stud, $f^3$, which serves as the fulcrum of the lever, and is attached to a rocking-frame, $f^4$, which rocks on a cross-shaft, $f^5$, near the rear feet of the frame.

The lever $f$ is actuated, through a link, $g^1$, by a crank, $g^2$, on the middle of a crank-shaft, $g$, which crank-shaft is driven from the driving-shaft $h$, on which is the driving-pulley $h^1$, by a pinion, $h^2$, on the driving-shaft, and a spur-wheel, $h^3$, on the crank-shaft.

The stretching-rollers or fingers, which co-operate with the ribs to stretch the hat-body, are stationary, and therefore the degree of pressure exercised between them and the ribs, upon the hat-body, depends on the height to which the ribs are raised by the lifting-rod, which is determined by the adjustment of the adjustable fulcrum-stud $f^3$, which has a screw, $i$, cut on it, and is provided with adjusting-nuts $i^1$ $i^2$, above and below the seat of the stud in the rocking-frame.

I have found it very advantageous to apply steam to fur and tender-wool hat-bodies, while undergoing the operation of stretching in this machine, and have devised the following mode of applying steam within the hat-body, when on the ribbed former, whereby the emission of steam is controlled by the action of the machine, so that steam is not discharged at the time the hat-body is being placed on the rib or taken therefrom, but only at the time of the action of the ribs and stretching-fingers upon the hat-body.

The upper part of the lifting-rod is made hollow, as shown in the drawings, to receive steam under pressure, and numerous fine holes are bored laterally through it, and also through the surrounding sleeve and the hub of the tip-ribs, communicating with the hollow part, for the purpose of discharging fine jets of steam upon or toward the inside of the hat-body, extended upon the supporting-ribs.

An elbow-pipe, $j$, connects the hollow part of the lifting-rod with a vertical pipe, $j^1$, sealed at the lower end, which, being so connected with the lifting-rod, moves up and down at the same time, through a sort of steam-chest, $j^2$, fast to the frame, and provided with stuffing-boxes at each end, for the vertical pipe to slide steam-tight in.

The steam-chest has also a supply-pipe, $j^3$, shown broken off in the drawings, but which should be connected with a steam-boiler and a waste-pipe, $j^4$, also shown broken off in the drawings, but which may be led off to any suitable place, to discharge the water from the steam-chest, and should be provided with a stop-cock, to close it when not required to be in use.

When the lifting-rod is in its lowest position, a portion of pipe which is moved by it through the steam-chest, projects down below the chest and the holes $k$, by which the steam passes from the steam-chest into the pipe. Being in that part of the pipe which is below the steam-chest, no steam can pass from the steam-chest to the hat-body at the time when the hat-body is put on or taken off, or until it is lifted up to the stretching-fingers, when the holes $k$, in the reciprocating-pipe, having come within the steam-chamber, steam passes from the same, through the pipe and hollow lifting-rod, to the inside of the hat-body.

At the top of the frame is firmly secured the horizontal circular plate $l$, shown detached at fig. 3, through which is a series of radial notches, $m^1$, in which are received the stretching fingers $m$, which co-operate with the hinged ribs for stretching the brim of the hat-body, and a circular rounded flange, or bead, $m^2$, outside the slots on which these fingers hinge, the fingers being notched on their outer edges, to correspond with the bead.

At the lower extremity of these stretching-fingers is a series of thin round-edged wheels, or rollers, $m^3$, one to each finger, attached to the fingers by pins, on which they turn when stretching the hat-body between the hinged ribs.

Rounding-edged surfaces of any other kind may be used at the lower extremity of the fingers, to press upon the hat-body, between the ribs; but I prefer to use rollers, as they prevent unnecessary friction and diminish the liability to tear the hat-body during the operation of stretching.

The upper ends of the outer series of fingers, $m$, are bent, and converge toward the vertical centre of the machine, where they all rest upon a horizontal circular plate, or flange, $m^4$, projecting from the hub of a hand-wheel, $m^5$, in which hub is cut an internal screw, which screws up and down on a vertical screw, $m^6$, fixed in the middle of the circular plate $l$.

By turning this hand-wheel, $m^5$, the fingers $m$ are simultaneously adjusted to their required positions, the circular flange supporting the fingers against the pressure upon them from below.

An inner series of slots, $n^1$, in the circular plate $l$ receives the inner series of stretching-fingers $n$, which are hinged on the inner circular bead, or flange $n^2$ in the same manner as the outer fingers, and are otherwise similarly constructed, except that their upper ends bend outward, and they are supported against pressure by a circular plate, $p$, just above them, which is itself held down, with yielding pressure, by the hand-wheel $p^1$, the hub of which is a nut, and turns on the screw $m^6$, communicating a yielding-pressure to the plate $p$, through an annular rubber spring, $p^2$, the plate having adjustable supports, in the shape of screw-pins $p^3$, the ends of which, resting on the circular frame-plate $l$, determine the position of the plate $p$, and, consequently, the position of the inner series of fingers, which co-operate with the tip-ribs.

The clamping-fingers $q$ are shaped as shown in the drawings, and have a rubber pad, $q^1$, inserted at the place where they rest on the hinged ribs, or rather on the hat-body over the ribs.

They are secured to a ring, $r$, supported by the sliding rods $r^1$, which pass up through guide-holes in the plates $l$ and $p$, and are fastened in the circular plate $r^2$, in the hub of which is a hole of proper size to admit of its sliding up and down freely on the central screw $m^6$.

A rubber washer, or spring, $s$, lying around the screw on top of the hand-wheel, takes the weight of the frame of the clamping-fingers.

The upper ends of the rods, by which the ring which supports the clamping-fingers is framed with the sliding circular plate above, are made adjustable by means of screw-threads and nuts, as shown in the drawings, for the purpose of setting the clamping-fingers so as to clamp the hat-body to the ribs before the stretching-fingers come in contact with it.

As before said, the machine is so constructed that either the tip-stretching ribs or the hinged ribs may be used separately or together. And the operation is simply to place the hat-body upon the supporting-ribs, when the lifting-rod is down, and the machine being in motion, it is carried up to the stretching-fingers, which, by pressing on the hat-body, between the ribs, stretch the same as required for blocking.

I claim as of my invention and improvements in machines for stretching hat-bodies, wherein the hat-bodies are stretched by and between conically-arranged supporting-ribs and exterior stretching-devices, as substantially described in Letters Patent of the United States, granted to me February 28, 1865—

1. Making the two series of supporting-ribs, which respectively support the tip and brim of the hat-body, adjustable relatively to each other, so as to conform to different heights of crowns of hat-bodies to be stretched, substantially as described.

2. Making the ribs of the lower series of supporting-ribs which support the brim conically adjustable at different angles of inclination, to conform to the variations of conical forms of hat-bodies, by hinging them to a central support, and providing them with a means of expansion and support beneath, substantially as described.

3. Making the supporting-ribs which support the tip and brim of the hat-body adjustable, so as to conform both to variations of heights of crowns and variations of conical forms of hat-bodies, substantially as described.

4. In combination with the series of stretching-devices which act upon the exterior of the brim of the hat-body, the adjustable hinged supporting-ribs which support the brim of the hat-body, in contradistinction to fixed supporting-ribs, for supporting the brim of the hat-body, substantially as described.

5. In combination with a series of supporting-ribs and a series of stretching-devices, operating to stretch a hat-body between them, substantially as described, a steam-pipe, or conduit within the limits of the supporting-ribs, whereby steam is applied directly to the hat-body placed thereon, substantially as described.

6. In combination with the supporting-ribs and stretching-devices, the steam-chest, the reciprocating pipe, and hollow lifting-rod, with its discharge-apertures, whereby steam is applied to the hat-bodies during the operation of stretching, and cut off when the hat-bodies are put on or taken off the supporting-ribs.

R. EICKEMEYER.

Witnesses:
F. C. TREADWELL, Jr.,
J. J. BARNETT.